United States Patent
Matsumoto et al.

(10) Patent No.: US 7,599,763 B2
(45) Date of Patent: Oct. 6, 2009

(54) VEHICLE STABILITY CONTROL SYSTEM

(75) Inventors: Toshiki Matsumoto, Kariya (JP);
Mamoru Sawada, Yokkaichi (JP)

(73) Assignee: Denso Corporation, Kariya (JP)

( * ) Notice: Subject to any disclaimer, the term of this patent is extended or adjusted under 35 U.S.C. 154(b) by 514 days.

(21) Appl. No.: 11/214,643

(22) Filed: Aug. 30, 2005

(65) Prior Publication Data

US 2006/0052908 A1    Mar. 9, 2006

(30) Foreign Application Priority Data

Sep. 6, 2004    (JP)    ............ 2004-258335

(51) Int. Cl.
*G06F 19/00* (2006.01)

(52) U.S. Cl. .......................... 701/1; 701/70
(58) Field of Classification Search ............ 701/1, 701/36, 70
See application file for complete search history.

(56) References Cited

U.S. PATENT DOCUMENTS

| | | | |
|---|---|---|---|
| 5,781,872 A | 7/1998 | Konishi et al. | |
| 5,802,478 A | 9/1998 | Iwasaki | |
| 6,151,546 A | 11/2000 | Schmitt et al. | |
| 6,683,539 B2 | 1/2004 | Trajkovic et al. | |
| 2002/0107106 A1 | 8/2002 | Kato et al. | |
| 2004/0036601 A1 | 2/2004 | Obradovich | |
| 2004/0142793 A1 | 7/2004 | Boll et al. | |
| 2005/0049761 A1 | 3/2005 | Kataoka et al. | |
| 2005/0182548 A1 | 8/2005 | Bernzen et al. | |
| 2005/0200088 A1* | 9/2005 | Sawada et al. | ............ 280/5.507 |
| 2005/0273209 A1 | 12/2005 | Bernzen et al. | |
| 2007/0150158 A1* | 6/2007 | Inoue et al. | ............ 701/93 |

FOREIGN PATENT DOCUMENTS

| | | |
|---|---|---|
| DE | 4014561 | 11/1991 |
| DE | 197 34 112 A1 | 11/1999 |
| DE | 103 31 367 A1 | 7/2002 |
| EP | 0 795 429 A2 | 9/1997 |
| GB | 2 388 579 A | 11/2003 |
| JP | 8-216642 | 8/1996 |
| JP | 10-264839 | 10/1998 |

(Continued)

OTHER PUBLICATIONS

Partial European Search Report dated Dec. 21, 2005.

(Continued)

*Primary Examiner*—Yonel Beaulieu
(74) *Attorney, Agent, or Firm*—Harness, Dickey & Pierce, PLC

(57) ABSTRACT

A vehicle stability control system includes a base required driving force calculation unit, an estimated driving force estimation unit, and a required driving force correction unit. The base required driving force calculation unit calculates a physical quantity to generate the base required driving force at a driving wheel. The estimated driving force estimation unit estimates a driving force as being generated in the vehicle. The required driving force correction unit obtains a correction to suppress a potential pitching vibration in the vehicle. The physical quantity calculated by the base required driving force calculation unit is corrected on the basis of the correction. The corrected required driving force obtained by the required driving force correction unit is generated at the driving wheel.

2 Claims, 12 Drawing Sheets

FOREIGN PATENT DOCUMENTS

| | | |
|---|---|---|
| JP | 2001-168599 | 6/2001 |
| JP | 2001-231109 | 8/2001 |
| JP | 2003-015741 | 1/2003 |
| JP | A-2004-168148 | 6/2004 |
| WO | WO 03/076228 A1 | 3/2003 |
| WO | WO 03/076243 A1 | 3/2003 |

OTHER PUBLICATIONS

Extended European Search Report dated Feb. 16, 2006.

Takeuchi et al, Technical Papers "Sensibility Analysis of Vibration Transfer Pass and Control of Input Force to Reduce Acceleration Shock" dated Apr. 1, 2003 with English Translation.

U.S. Appl. No. 11/274,766, filed Nov. 15, 2005, Okada et al.

United States Office Action dated Jul. 2, 2008 on corresponding U.S. Appl. No. 11/274,766.

Office Action issued from Japan Patent Office dated Sep. 18, 2008 in the corresponding Japanese Patent Application No. 2004-258335.

Office action dated Mar. 17, 2009 in Japanese Application No. 2004-258335.

* cited by examiner

GOOD HANDLING AND STABILITY
(LARGE CORNERING POWER)

POOR HANDLING AND STABILITY
(SMALL CORNERING POWER)

VEHICLE'S TAIL SWING CAUSED BY INCREASE IN AN AMOUNT OF DRIVER'S STEERING OPERATION

SWING BACK

DELAY IN RISE OF CORNERING FORCE

ACCELERATING

DECELERATING

TURNING

VEHICLE STABILITY CONTROL SYSTEM

CROSS REFERENCE TO RELATED APPLICATIONS

This application is based upon and claims the benefit of priority of Japanese Patent Application No. 2004-258335, filed on Sep. 6, 2004, the contents of which are incorporated herein by reference.

FIELD OF THE INVENTION

The present invention relates to a vehicle stability control system that stabilizes vehicle traveling by controlling a variation of cornering power depending on a variation of front and rear wheel contact loads.

BACKGROUND OF THE INVENTION

When a vehicle is turned, the total sum of cornering forces, which are forces produced at the tires, balances a centrifugal force acting on the vehicle. The relationship between slip angles and cornering forces depends on a vehicle speed and a tire performance, where the slip angle is defined as the angle between the direction a vehicle is traveling and the direction the tire is pointed. An exemplary relationship between the slip angles and cornering forces for each of standard and high performance tires is shown in FIG. 8.

As shown in FIG. 8, the cornering forces linearly increase with the slip angles β when the slip angles β are less than or equal to a certain value. Therefore, the higher the slip angle β, the higher the cornering force. The high performance tire can obtain higher cornering forces than the standard tire under the same slip angle β.

Accordingly, as a vehicle increases speed, the vehicle's tail is pointed outside and the slip angles β of the rear wheels must be increased to ensure the cornering force against the centrifugal force. This operation, however, depends on a tire's performance etc., and since higher cornering force is obtained with higher performance tires, the vehicle can be turned stably with less tail swing.

In other words, as cornering power, which is defined as the slope of cornering forces with respect to slip angles β, becomes larger, higher cornering power can be obtained even with a small slip angle β, thereby obtaining good handling and stability. In contrast, as the cornering power becomes smaller, larger slip angle β is necessary to obtain a large cornering force, resulting in poor handling and stability.

For example, as shown in FIG. 9A if a sufficient cornering force can be produced even with a small slip angle β, a vehicle easily follows a target trajectory and can maintain its stable posture without a large amount of driver's steering operation. In contrast, as shown in FIG. 9B, if a sufficient cornering force cannot be obtained without a large slip angle β, when a vehicle is turned, a delay may occur in the rise of cornering force. To cope with this situation, if the driver increases an amount of steering operation, a vehicle's tail swing may occur. Furthermore, a swingback may also occur when the vehicle returns to the target trajectory.

Accordingly, the cornering power of the tire is an important factor to determine a vehicle dynamic performance. Such a description is provided in Japanese Patent Laid-Open Publication No. 2001-168599.

The cornering power of the tire varies with, for example, contact load, even if the same tires are used. The smaller the contact load, the smaller the cornering power becomes; and the larger the contact load, the larger the cornering power becomes. That is, the cornering power of the tire largely depends on contact load.

The contact load, however, fluctuates with the on-spring vehicle body vibrations produced by, for example, driver's operation disturbances such as driving, braking, steering, and the like, and disturbance inputs from the road, thereby fluctuating the cornering power. As a result, there is a problem that the posture variation of the vehicle occurs, thereby deteriorating stable traveling and comfort, and affecting the handling and stability.

The present invention addresses the above-described and other problems by providing a system that suppresses the effects of the driver's operation disturbances, road disturbances, and the like, to stabilize the body posture and vehicle performance and to improve the comfort and stability of the vehicle.

To accomplish this, the present inventors studied the fluctuation of the contact loads applied to each of the front and rear wheels by the above-described driver's operation disturbances and road disturbances. This contact load fluctuation at the front and rear wheels will now be described.

The contact load fluctuation at the front and rear wheels is produced by, for example, pitching vibration. The 'pitching' here means a movement that occurs about the vehicle's transverse axis at the center of the vehicle pitching. The energy produced by this pitching vibration is referred to as pitching vibration energy.

The pitching vibration is generated by, for example, a squat under driving (acceleration), a nosedive under braking (deceleration) and during steering (turning), or various disturbance inputs from the road. These states are illustrated in FIG. 10.

As shown in FIG. 10A, during driving (acceleration), the vehicle body side cannot follow the rotation of the wheels and is left behind, so the front side (nose) of the vehicle is moved upward about the center of the vehicle pitching, resulting in the occurrence of squat. In contrast, during braking (deceleration), as shown in FIG. 10B, braking force acts on the wheels, but the body cannot follow the deceleration of the vehicle due to inertia, so that the front side (nose) of the vehicle is moved downward about the center of the vehicle pitching, resulting in the occurrence of nose-dive. As shown in FIG. 10C, during steering (turn), cornering drag occurs and thereby the wheels are decelerated, so the nose-dive occurs as during braking (deceleration).

Rotational vibrations generated about the center of the vehicle pitching, such as the squat and nose-dive, are pitching vibrations. The energies producing these pitching vibrations are pitching vibration energies, which always occur while the vehicle is traveling.

These pitching vibrations and the like cause the contact loads at each of the front and rear wheels and the relation of forces applied to the wheels to vary in comparison with those when traveling at a constant speed. That is, as shown in FIG. 10A, during the squat, contact load Wf at the front wheel becomes small and contact load Wr at the rear wheel becomes large in comparison with those when traveling at a constant speed, whereby a driving torque reaction becomes large. As shown in FIG. 10B, during the nose-dive under deceleration, contact load Wf at the front wheel becomes large and contact load Wr at the rear wheel becomes small in comparison with those when traveling at a constant speed, whereby braking force on the front wheel becomes large and braking force on the rear wheel becomes small. As shown in FIG. 10C, also during the nose-dive under turn, contact load Wf at the front wheel becomes large and contact load Wr at the rear wheel becomes small in comparison with those when traveling at a constant speed.

The contact loads Wf and Wr fluctuate as described above, so that the cornering power fluctuates. As a result, a vehicle cannot turn stably and the posture variation of the vehicle occurs, thereby damaging a stable traveling and accordingly a comfortable ride, and affecting the handling and stability.

A relationship among the pitching vibration, the front and rear wheel contact loads, and the front and rear wheel cornering powers is illustrated in timing diagrams shown in FIG. 11. When a pitching vibration shown in FIG. 11A occurs, as shown in FIG. 11B, the loads Wf and Wr at the front and rear wheels are obtained by adding suspension reaction variations $\Delta Wf$ and $\Delta Wr$ caused by the pitching vibration to the respective loads Wfo and Wro at the front and rear wheels when traveling at a constant speed, and are given by the following equation 1.

$$Wf = Wfo + \Delta Wf, \; Wr = Wro + \Delta Wr \quad \text{Equation 1}$$

Accordingly, the loads Wf and Wr at the front and rear wheels have waveforms corresponding to the waveform of the pitching vibration. As shown in FIG. 11C, as regard to the cornering powers Kcf and Kcr of the respective front and rear wheels, the cornering powers Kcfo and Kcro of the respective front and rear wheels when traveling at a constant speed also have similar waveforms to those of the loads Wf and Wr at the front and rear wheels because they are obtained by multiplying the respective loads Wf and Wr at the front and rear wheels by a coefficient Cw in the linear region of the tire performance.

Accordingly, if the driving force generated by an engine is corrected on the basis of the contact load variations at the front and rear wheels, which are caused by, for example, the pitching vibration, the effects of the driver's operation disturbances and road disturbances can be suppressed to stabilize the body posture and vehicle performance and improve a comfortable ride and stable traveling of the vehicle.

Next, the inventors studied on the state quantities of a vehicle using an on-spring body vibration model.

The state quantities of the vehicle will be described with reference to a schematic diagram of the on-spring body vibration model shown in FIG. 12.

In the on-spring body vibration model shown in FIG. 12, it is assumed that a vibration about the center of the pitching is produced on the on-spring part in response to a torque reaction variation $\Delta$Tw with respect to an arbitrary stationary state. In this case, the on-spring body vibration is based on the assumption that the vehicle body is regarded as a plate of an arbitrary reference plane being in parallel with the horizontal direction and the plate is provided with tires supported by suspensions.

In this on-spring body vibration model, constants are defined as follows. First, for the respective front two wheels and rear two wheels, all provided on the reference plane B, spring constants of the suspensions [N/m] are denoted as Kf and Kr, damping coefficients of the suspensions [Ns/m] as Cf and Cr, longitudinal stiffnesses of the tires [N/m] as Ktf and Ktr, and longitudinal damping coefficients of the tires [Ns/m] as Ctf and Ctr.

Further, a radius of the tires is denoted as rt, a vehicle body mass on the spring [kg] as Mu, an unsprung-mass at the front wheel [kg] as mf, an unsprung-mass at the rear wheel [kg] as mr, a wheel base [m] as L, a distance between the center of gravity of the vehicle (center of pitching) and the front wheel shaft [m] as Lf, a distance between the center of gravity of the vehicle and the rear wheel shaft [m] as Lr, height of the center of gravity of the vehicle [m] as hcg, and height of the center of pitching of the body [m] as hcp.

Furthermore, pitching moment of inertia of the body [kgm$^2$] and acceleration of gravity [m/s$^2$] are denoted Ip and g, respectively.

As for independent variables, vertical displacement of the on-spring vehicle body [m] is denoted as x, vertical displacement of the front wheel [m] as xtf, vertical displacement of the rear wheel [m] as xtr, and pitch angle about the virtual pitching center [rad] as $\theta p$.

First of all, since the virtual pitch angle about the pitching center is denoted $\theta p$, the amounts of displacement about the pitch center at the front wheel shaft located at a distance of Lf from the pitching center and at the rear wheel shaft located at a distance of Lr from the pitching center, are given by Lf$\theta p$ and Lr$\theta p$, respectively. However, since an amount of displacement in the vertical direction of the vehicle body is reduced due to the longitudinal stiffness of the tire, the total amounts of displacement in the vertical direction of the vehicle body are given by x+Lf$\theta p$−xtf on the front wheel side and by x−Lf$\theta p$−xtr on the rear wheel side.

Therefore, the equation of motion about the pitch center of the vehicle body is expressed by equation 2.

$$Ip\theta p'' = -Lf\{Kf(x+Lf\theta p-xtf)+Cf(x'+Lf\theta p'-xtf')\}+Lr\{Kr(x-Lr\theta p-xtr)+Cr(x'-Lr\theta p'-xtr')\}+(hcg-hcp)\theta pMug+\Delta Tw+(hcp+x)\Delta Tw/rt \quad \text{Equation 2}$$

The equation describing the vertical motion of the vehicle body and equations describing the vertical motion at the front and rear wheels are given by equations 3 to 5, respectively.

$$Mux'' = -Kf(x+Lf\theta p-xtf)-Cf(x'+Lf\theta p'-xtf')-Kr(x-Le\theta p-xtr)-Cr(x'-Lf\theta p'-xtr') \quad \text{Equation 3}$$

$$mfxtf'' = -Kf(xtf-x-Lf\theta p)-Cf(xtf'-x'-Lf\theta p')-Ktfxtf-Ctfxtf' \quad \text{Equation 4}$$

$$mrxtr'' = -Kr(xtr-x-Lr\theta p)-Cr(xtr'-x'-Lr\theta p')-Ktrxtr-Ctrxtr' \quad \text{Equation 5}$$

If these equations 3 to 5 and equation 2 are modified, the following equations 6 to 9 are obtained, respectively.

Equation 6:
$$Mux'' = -(Kf+Kr)x - (Cr+Cr)x' + Kfxtf + Cfxtf' + Krxtr + Crxtr' - (KfLf - KrLr)\theta p - (CfLf - CrLr)\theta p'$$

Equation 7:
$$mfxtf'' = Kfx + Cfx' - (Kf+Ktf)xtf - (Cf+Ctf)xtf' + KfLf\theta p + CfLf\theta p'$$

Equation 8:
$$mrxtr'' = Krx + Crx' - (Kr+Ktr)xtr - (Cr+Ctr)xtr' - KrLr\theta p - CrLr\theta p'$$

Equation 9:
$$\begin{aligned}Ip\theta p'' =& -(KfLf - KrLr)x - (CfLf - CrLr)x' + KfLfxtf + CfLfxtf' - \\ & KrLrxtr - CrLrxtr' - \{(KfLf^2 + KrLr^2) - (hcg - hcp)Mug\}\theta p - \\ & (CfLf^2 + CrLr^2)\theta p' + \{1 + (hcp+x)/rt\}\Delta Tw \\ \approx & -(KfLf - KrLr)x - (CfLf - CrLr)x' + KfLfxtf + CfLfxtf' - \\ & KrLrxtr - CrLrxtr' - \{(KfLf^2 + KrLr^2) - (hcg - hcp)Mug\}\theta p - \\ & (CfLf^2 + CrLr^2)\theta p' + (1 + hcp/rt)\Delta Tw\end{aligned}$$

Therefore, if these equations are solved with respect to respective x″, xtr″, xtf″, and $\theta p$″, these values are described by the parameters indicating the state quantities, such as x, x′, xtf, xtf′, xtr, xtr′, $\theta p$, and $\theta p$′. Accordingly, if the state quantities are defined such that x1=x, x2=x', x3=xtf, x4=xtf', x5=xtr, x6=xtr', x7=θp, x8=θp', and ΔTw=u and if the coefficients of the variables in the above equations are replaced to a1 to a8, b1 to b8, c1 to c8, d1 to d8, and p, respectively, the following relationships are obtained.

Equation 10:

$$x1' = x'$$
$$= x2$$

Equation 11:

$$x2' = x1''$$
$$= x''$$
$$= -(Kf+Kr)/Mu \cdot x - (Cr+Cr)/Mu \cdot x' + Kf/Mu \cdot xtf +$$
$$Cf/Mu \cdot xtf' + Kr/Mu \cdot xtr + Cr/Mu \cdot xtr' -$$
$$(KfLf - KrLr)/Mu \cdot \theta p - (CfLf - CrLr)/Mu \cdot \theta p'$$
$$= a1x1 + a2x2 + a3x3 + a4x4 + a5x5 + a6x6 + a7x7 + a8x8$$

Equation 12:

$$x3' = xtf'$$
$$= x4$$

Equation 13:

$$x4' = x''3$$
$$= xtf''$$
$$= Kf/mf \cdot x + Cf/mf \cdot x' - (Kf+Ktf)/mf \cdot xtf -$$
$$(Cf+Ctf)/mf \cdot xtf' + KfLf/mf \cdot \theta p + CfLf/mf \cdot \theta p'$$
$$= b1x1 + b2x2 + b3x3 + b4x4 + b7x7 + b8x8$$

Equation 14:

$$x5' = xtr'$$
$$= x6$$

Equation 15:

$$x6' = x5''$$
$$= xtr''$$
$$= Kr/mr \cdot x + Cr/mr \cdot x' - (Kr+Ktr)/mr \cdot xtr -$$
$$(Cr+Ctr)/mr \cdot xtr' - KrLr/mr \cdot \theta p - CrLr/mr \cdot \theta p'$$
$$= c1x1 + c2x2 + c5x5 + c6x6 + c7x7 + c8x8$$

Equation 16:

$$x7' = \theta p'$$
$$= x8$$

Equation 17:

$$x8' = x7''$$
$$= \theta p''$$
$$= -(KfLf - KrLr)/Ip \cdot x - (CfLf - CrLr)/Ip \cdot x' + KfLf/Ip \cdot xtf +$$
$$CfLf/Ip \cdot xtf' - KrLr/Ip \cdot xtr - CrLr/Ip \cdot xtr' - \{(KfLf^2 + KrLr^2) -$$
$$(hcg - hcp)Mug\}/Ip \cdot \theta p - (CfLf^2 + CrLr^2)/Ip \cdot \theta p' +$$
$$(1+hcp/rt)/Ip \cdot \Delta Tw$$
$$= d1x1 + d2x2 + d3x3 + d4x4 + d5x5 + d6x6 + d7x7 + d8x8$$
$$+ pu$$

In the above equation 11, a1=-(Kf+Kr)Mu, a2=-(Cf+Cr)/Mu, a3=Kf/Mu, a4=Cf/Mu, a5=Kr/Mu, a6=Cr/Mr, a7=-(KfLf-KrLr)/Mu, and a8=-(CfLf-CrLr)/Mu.

In equation 13, b1=-Kf/mf, b2=Cf/mf, b3=-(Kf+Ktf)/mf, b4=-(Cf+Ctf)/mf, b7=KfLf/mf, and b8=CfLf/mf.

In equation 15, c1=Kr/mr, c2=Cr/mr, c5=-(Kr+Ktr)/mr, c6=-(Cr+Ctr)/mr, c7=-KrLr/mr, and c8=-CrLr/mr.

In equation 17, d1=-(KfLf-KrLr)/Ip, d2=-(CfLf-CrLr)/Ip, d3=KfLf/Ip, d4=CfLf/Ip, d5=-KrLr/Ip, d6=-CrLr/Ip, d7=-{(KfLf²+KrLr²)-(hcg-hcp)Mug}/Ip, d8=-(CfLf²+CrLr²)/Ip, and p=1+hcp/rt)/Ip.

Therefore, if equations 10 to 17 are described by a state space model, the equation of state is given by an eight by eight determinant as shown in equation 18, which is simplified to equation 19.

Equation 18:

$$\underbrace{\begin{bmatrix} x1' \\ x2' \\ x3' \\ x4' \\ x5' \\ x6' \\ x7' \\ x8' \end{bmatrix}}_{x'} = \underbrace{\begin{bmatrix} 0 & 1 & 0 & 0 & 0 & 0 & 0 & 0 \\ a1 & a2 & a3 & a4 & a5 & a6 & a7 & a8 \\ 0 & 0 & 0 & 1 & 0 & 0 & 0 & 0 \\ b1 & b2 & b3 & b4 & 0 & 0 & b7 & b8 \\ 0 & 0 & 0 & 0 & 0 & 1 & 0 & 0 \\ c1 & c2 & 0 & 0 & c5 & c6 & c7 & c8 \\ 0 & 0 & 0 & 0 & 0 & 0 & 0 & 1 \\ d1 & d2 & d3 & d4 & d5 & d6 & d7 & d8 \end{bmatrix}}_{A} \underbrace{\begin{bmatrix} x1 \\ x2 \\ x3 \\ x4 \\ x5 \\ x6 \\ x7 \\ x8 \end{bmatrix}}_{x} + \underbrace{\begin{bmatrix} 0 \\ 0 \\ 0 \\ 0 \\ 0 \\ 0 \\ 0 \\ p \end{bmatrix}}_{B} u$$

Equation 19:

$$x' = Ax + Bu$$

The equation of state in the on-spring body vibration model is thus obtained.

Accordingly, if axle torque (a physical quantity corresponding to the driving force) generated by the engine is corrected on the basis of this equation of state, the effects of the driver's operation disturbances and road disturbances may be suppressed to stabilize the body posture and vehicle performance and improve a comfortable ride and stable traveling of the vehicle.

Therefore, the inventors considered which state quantities should be controlled using the above equation of state.

The first thing to be considered is to control the pitching vibration. That is, since the pitching vibration is a factor to cause the fluctuations of the front and rear wheel contact loads to occur, if it is suppressed, the fluctuations of the front and rear wheel contact loads can be suppressed, so that the variation of the cornering power can be prevented. Therefore, it suffices for the pitching vibration to be suppressed such that the variation of the state variable θp or the derivative of the state variable θp with respect to time (dθp/dt=θp') is quickly reduced to zero. The output equation, which is the derivative of this state variable θp with respect to time, is obtained from the equation of state given by equations 17 and 18 as follows.

Equation 20:

$$y = x8 = \underbrace{[0 \ 0 \ 0 \ 0 \ 0 \ 0 \ 0 \ 1]}_{C} \begin{bmatrix} x1 \\ x2 \\ x3 \\ x4 \\ x5 \\ x6 \\ x7 \\ x8 \end{bmatrix} = Cx$$

Next thing to be considered is to suppress the fluctuation of the front or rear wheel contact load due to the pitching vibration. If the fluctuation of the front or rear wheel contact load is suppressed, the variation of the cornering power can be prevented.

Since the variations $\Delta Wf$ and $\Delta Wr$ of these front and rear wheel contact loads equal to the variations of the respective suspension reactions, they are given by the following equations.

Equation 21:

$$\Delta Wf = -Kf(x + Lf\theta p - xtf) - Cf(x' + Lf\theta p' - xtf')$$
$$= -Kfx1 - Cfx2 + Kfx3 + Cfx4 - KfLfx7 - CfLfx8$$

Equation 22:

$$\Delta Wr = -Kr(x + Lr\theta p - xtr) - Cr(x' + Lr\theta p' - xtr')$$
$$= -Krx1 - Crx2 + Krx5 + Crx6 - KrLrx7 - CrLrx8$$

Suppressing the variations of the front and rear wheel contact loads is equivalent to reducing dynamic variations quickly to zero, which are described by the derivative terms of the variations of the front and rear wheel contact loads (in the above equations 20 and 21). These derivative terms $\Delta Wfd$ and $\Delta Wrd$ are given by the following equations.

Equation 23:

$$\Delta Wfd = -Cf(x' + Lf\theta p' - xtf')$$
$$= Cfx2 - Cfx4 - CfLfx8$$

Equation 24:

$$\Delta Wrd = -Cr(x' + Lr\theta p' - xtr')$$
$$= -Crx2 + Crx6 - CrLrx8$$

Accordingly, the output equations for the derivative terms $\Delta Wfd$ and $\Delta Wrd$ of the variations of the front and rear wheel contact loads are given by the following equations 25 and 26, respectively, where e2f=−Cf, e4f=Cf, and e8f=−CfLf in equation 25, and e2r=−Cr, e6r=Cr, and e8r=CrLr in equation 26.

Equation 25:

$$y = -Cfx2 + Cfx4 - CfLfx8$$

$$= \underbrace{[0 \ e2f \ 0 \ e4f \ 0 \ 0 \ 0 \ e8f]}_{C} \begin{bmatrix} x1 \\ x2 \\ x3 \\ x4 \\ x5 \\ x6 \\ x7 \\ x8 \end{bmatrix}$$

$$= Cx$$

Equation 26:

$$y = -Cfr2 + Crx6 + CrLrx8$$

$$= \underbrace{[0 \ e2r \ 0 \ 0 \ 0 \ e6r \ 0 \ e8r]}_{C} \begin{bmatrix} x1 \\ x2 \\ x3 \\ x4 \\ x5 \\ x6 \\ x7 \\ x8 \end{bmatrix}$$

$$= Cx$$

Another thing to be considered is to suppress vehicle body vibration in the vertical direction. Since the vehicle body vibration in the vertical direction is also a factor to cause the fluctuations of the front and rear wheel contact loads to occur, if it is suppressed, the fluctuations of the front and rear wheel contact loads can be suppressed, so that the variation of the cornering power can be prevented. Since the vehicle body vibration in the vertical direction is given by the state variable x, it suffices that the variation of the state variable x or the derivative of the state variable x with respect to time (dx/dt=x') is quickly reduced to zero. The output equation for the derivative of this state variable x with respect to time is obtained from the equation of state given by equations 18 and 19 as follows.

Equation 27:

$$y = x2$$

$$= \underbrace{[0 \ 1 \ 0 \ 0 \ 0 \ 0 \ 0 \ 0]}_{C} \begin{bmatrix} x1 \\ x2 \\ x3 \\ x4 \\ x5 \\ x6 \\ x7 \\ x8 \end{bmatrix}$$

$$= Cx.$$

SUMMARY

Based on the above considerations, one aspect of the present invention includes a base required driving force calculation unit that calculates a physical quantity corresponding to a base required driving force desired by a driver to generate the base required driving force at a driving wheel of a vehicle; an estimated driving force estimation unit that obtains a physical quantity corresponding to an estimated driving force that is estimated to be being generated in the vehicle; a required driving force correction unit that obtains a corrected required driving force in such a way that a pitching vibration possibly occurring in the vehicle when the estimated driving force is generated is obtained on the basis of the physical quantity corresponding to the estimated driving force, a correction to suppress the pitching vibration is obtained, and then the physical quantity corresponding to the base required driving force calculated by the base required driving force calculation unit is corrected on the basis of the correction; wherein the corrected required driving force obtained by the required driving force correction unit is generated at the driving wheel.

As described above, a correction to suppress the pitching vibration is obtained and a physical quantity corresponding to the base required driving force is corrected on the basis of the correction. The pitching vibration is thereby timely suppressed so as to reduce the effects of ever-changing various disturbances caused by driver's operation and road condition etc., so that each state quantity of the vehicle can be stabilized. Traveling of the vehicle can thereby be stabilized.

For example, in another aspect of the present invention, the required driving force correction unit has an equation of state describing state quantities of the vehicle on the basis of an on-spring body model of the vehicle and also an output equation describing the pitching vibration with respect to the state quantities on the basis of the equation of state, and a physical quantity corresponding to the base required driving force is corrected so as to suppress the fluctuation of the pitching vibration obtained from the output equation and the state quantities. The equation of state here is given by, for example, the above equation 18 or 19, and the output equation is given by, for example, equation 20.

Further, in place of pitching vibration described above, yet another aspect of the present invention includes a correction to reduce the derivative term of the fluctuation of the front or rear wheel contact load may be obtained to correct a physical quantity corresponding to the base required driving force. Alternatively, yet another aspect of the present invention includes a correction to suppress the fluctuation of the vertical motion of the vehicle body may be obtained to correct a physical quantity corresponding to the base required driving force.

In these cases, the equation of state is given by, for example, equation 18 or 19, and the output equations are given by, for example, equations 25 to 27.

As the physical quantity corresponding to the base required driving force, for example, a base required engine torque or a base required output axle torque can be cited.

Still another aspect of the present invention includes a running resistance disturbance estimation unit that estimates a running resistance disturbance applied to a wheel of the vehicle, wherein the required driving force correction unit estimates that a value obtained by adding a running resistance disturbance estimated by the running resistance disturbance estimation unit to a physical quantity corresponding to the estimated driving force obtained by the estimated driving force calculation unit is a currently generated driving force, and a correction is obtained as the one used when a driving force, in which this running resistance disturbance is taken into consideration, is generated.

As described above, the running resistance disturbance estimation unit estimates a running resistance disturbance, and the state quantities in the equation of state can be obtained in taking the running resistance disturbance into consideration. The running resistance disturbance here is based on, for example, the derivative value of the front wheel speed and the weight of the vehicle, and is obtained by, for example, multiplying these factors.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
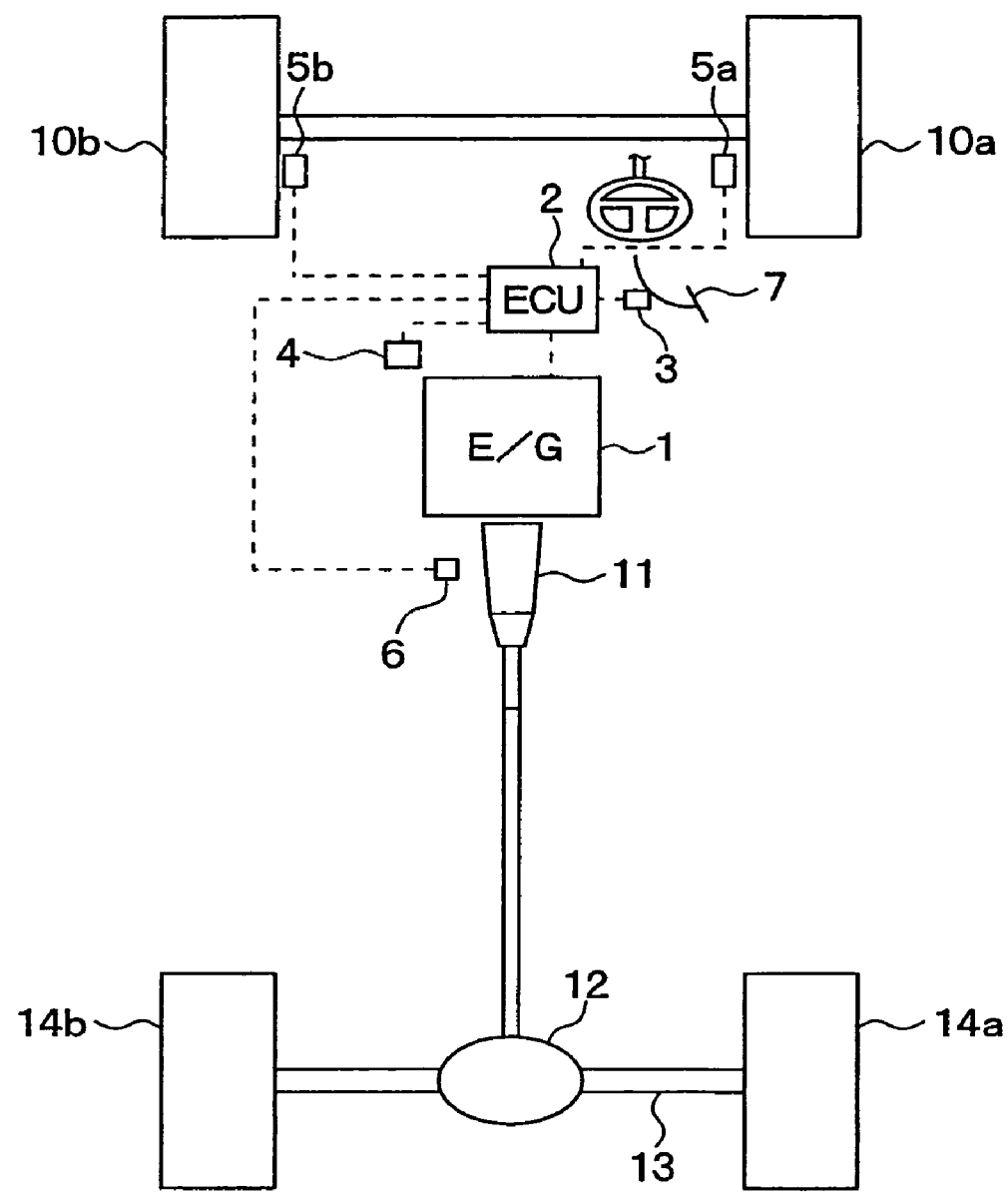
FIG. 1 is a top view of a vehicle stability control system according to one embodiment of the present invention adapted to a vehicle.

Embodiments of the invention will now be described with reference to the attached drawings, in which like elements are indicated by like reference characters.

First Embodiment

The vehicle stability control system according to the first embodiment of the invention will be described with reference to FIG. 1, which schematically illustrates its structure. The present embodiment will be described assuming a vehicle with a rear-wheel drive, but it is also applicable to a vehicle with a front-wheel drive or a four-wheel drive.

The vehicle stability control system of the first embodiment adjusts driving torque generated by an engine 1 installed in a vehicle to stabilize the fluctuation of cornering power according to the fluctuation of front and rear wheel loads caused by pitching vibration energy and other energies, thereby stabilizing the vehicle body posture and vehicle performance.

In the vehicle stability control system shown in FIG. 1, the engine 1 is controlled by an engine ECU 2. The engine ECU 2 receives detection signals from an acceleration stroke sensor 3, an engine speed sensor 4, front wheel speed sensors 5a and 5b, and a gear position sensor 6.

The acceleration stroke sensor 3 outputs a detection signal that corresponds to a position of an accelerator pedal 7. The engine ECU 2 determines an accelerator manipulated variable on the basis of the detection signal from the acceleration stroke sensor 3.

The engine speed sensor 4 is a known sensor installed in the engine 1 and outputs a detection signal that corresponds to the engine rotational speed.

In the engine ECU 2, a base required engine torque that becomes an engine torque desired by the driver is calculated from the detection signal from the engine speed sensor 4 and the accelerator manipulated variable obtained from the detection signal from the acceleration stroke sensor 3.

The front wheel speed sensors 5a and 5b are installed in the respective front wheels 10a and 10b, which become steering wheels, and comprise the wheel speed sensor 5a for the right front wheel and the wheel speed sensor 5b for the left front wheel. Each of these wheel speed sensors 5a and 5b can be a known type sensor such as, for example, an electromagnetic pickup type that outputs a different detection signal according to the rotation of the gear of a gear type rotor installed at the axel, and generates a detection signal according to the rotation of the front wheel. The detection signals from the front wheel speed sensors 5a and 5b are used for obtaining a running resistance disturbance at the front wheel, which is produced according to the front wheel speed.

The gear position sensor 6 detects a current gear position. The detection signal from the gear position sensor 6 is input to the engine ECU 2 in which a gear ratio depending on the current gear position is obtained from the input detection signal.

The engine ECU 2 then performs various computations on the basis of the detection signals from these sensors 3, 4, 5a, 5b, and 6, and adjusts engine power on the basis of the computation results. The axle torque is thereby adjusted and transmitted through a transmission 11, a final reduction gear 12, and a driving axle 13 to rear wheels 14a and 14b, which become driving wheels.

The engine ECU 2 will be described in detail with reference to FIG. 2, which is a block diagram schematically illustrating this engine ECU 2.

The engine ECU 2 comprises a microcomputer having, for example, a CPU, a RAM, a ROM and I/O ports. The CPU executes an engine control program stored in the ROM and performs various computations, whereby the engine power is controlled by the engine 1.

Figure 2:
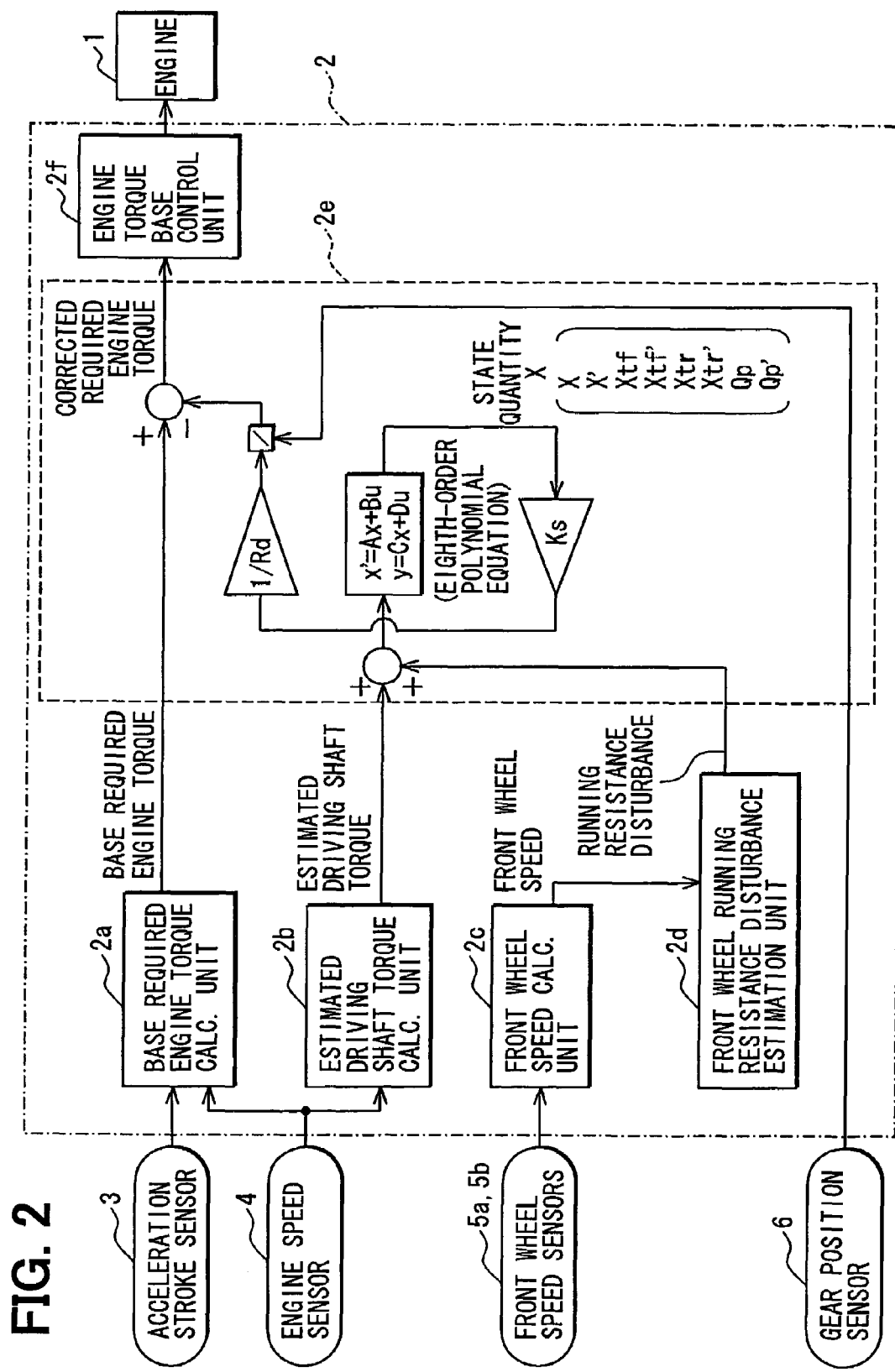
FIG. 2 is a block diagram of an engine electronic control unit of the vehicle stability control system shown in FIG. 1.

Specifically, as shown in FIG. 2, the engine ECU 2 comprises a base required engine torque calculation unit 2a, an estimated driving shaft torque calculation unit 2b, a front wheel speed calculation unit 2c, a front wheel running resistance disturbance estimation unit 2d, a required engine torque correction unit 2e, and an engine torque base control unit 2f.

The base required engine torque calculation unit 2a receives the detection signal output from the pedal stroke sensor 3, and obtains an accelerator manipulated variable as a physical quantity on the basis of this detection signal. In addition, it obtains a base required engine torque corresponding to a base required driving force on the basis of the manipulated variable and the detection signal output from the engine speed sensor 4. The base required engine torque obtained here becomes an engine torque used for accelerating and decelerating the vehicle, that is, becomes an engine shaft torque that is basically required. The base required engine torque calculation unit 2a outputs its calculation result to the required engine torque correction unit 2e.

On the basis of the detection signal from the engine speed sensor 4, the estimated driving shaft torque calculation unit 2b calculates an estimated driving shaft torque, that is, calculates a driving shaft torque that appears to be being generated when the detection signal is received. The estimated driving shaft torque calculation unit 2b also outputs its calculation result to the required engine torque correction unit 2e.

The front wheel speed calculation unit 2c calculates wheel speeds of both front wheels, which become steering wheels, on the basis of the detection signals from both the wheel speed sensors 5a and 5b. The output of the front wheel speed calculation unit 2c is connected to the front wheel running resistance disturbance estimation unit 2d.

The front wheel running resistance disturbance estimation unit 2d estimates a front wheel running resistance disturbance on the basis of the calculated front wheel speed. A running resistance occurs at the front wheel according to wheel speed. Thus, its running resistance disturbance is estimated from the wheel speed. Multiplying the derivative value of the wheel speed by the vehicle weight, for example, can obtain force [N/m] in the translation direction, and further multiplying it by the radius of the rolling wheel can obtain the running resistance disturbance as a moment [N] acting on the rolling wheel.

Obtaining a running resistance disturbance on the basis of the first-order derivative of the wheel speed can make it possible to obtain an amount of, as a result, the running resistance disturbance being received, regardless of the cause of the running resistance disturbance. The running resistance disturbance occurs because of, for example, the cornering drag caused by driver's steering and the roughness of the road. In any case, however, since the running resistance disturbance results in the variation of the wheel speed, if it is calculated from the variation (derivative value) of the wheel speed, the running resistance disturbance received by the rotating wheel can be obtained regardless of its cause.

This running resistance disturbance can also be estimated in such a way that characteristics between the wheel speed and running resistance disturbance are stored in the memory of the engine ECU 2 in advance and the running resistance disturbance corresponding to the calculated wheel speed is selected based on the characteristics.

The required engine torque correction unit 2e estimates a current driving torque by adding the estimated driving shaft torque calculated by the estimated driving shaft torque calculation unit 2b and the running resistance disturbance obtained in the front wheel running resistance disturbance estimation unit 2d. The required engine torque correction unit 2e uses the current driving torque as an input to obtain a correction, which is necessary for suppressing the pitching vibration, from the equation of state in the on-spring vehicle body vibration model, and then, based on the correction, corrects the base required engine torque calculated by the base required engine torque calculation unit 2a.

Specifically, if the current driving torque is estimated, each state quantity of various on-spring vehicle body vibrations having an excitation source created by the driving torque reaction to the current driving torque can be estimated on the basis of the equation of state given by equations 18 and 19. In the present embodiment, by substituting each estimated state quantity into the output equation of the pitching vibration given by equation 20, the pitching vibration and a correction to be able to suppress this pitching vibration are obtained.

More specifically, as shown in FIG. 2, the output y (=x8) indicating a variation of the pitching vibration corresponding to the estimated driving torque is obtained from the vehicle body vibration model. By multiplying this output y by a predetermined state feedback gain Ks, the correction is obtained. The state feedback gain Ks here is set according to the number of the state quantities K1 to K8, and is obtained by an optimal regulator design method with respect to each of the state quantities x (x, x', xtf, xtf', xtr, xtr', Qp, Qp') calculated using the vehicle body vibration model.

The correction obtained as described above is multiplied by the speed reducing ratio (differential ratio: 1/Rd) of the final reduction gear 12 and then is divided by the gear ratio in the transmission 11, which is obtained on the basis of the detection signal output from the gear position sensor 6. The resulting value is subtracted from the base required torque calculated by the base required torque calculation unit 2a.

The correction of the engine torque is thereby obtained as an absolute value with respect to the base required engine torque. The absolute value is used as a corrected required engine torque, which is in turn input to the engine torque base control unit 2f.

The engine torque base control unit 2f sets the amount of intake air, amount of fuel injection, and ignition timing of the engine 1 so as to obtain the corrected required engine torque, and generates corresponding output signals. The output signals are transmitted to each part of the engine 1 to adjust the amount of intake air, amount of fuel injection, and ignition timing, thereby outputting the energy by which the corrected required engine torque can be obtained.

This energy is then transmitted as the rotational energy through the transmission 11 and the final reduction gear 12, etc., to the driving wheels 14a and 14b at which the axle torque is generated according to the corrected required engine torque.

As described above, according to the vehicle stability control system of the embodiment, various on-spring body vibrations are estimated using the vehicle body vibration model, and the required engine torque corresponding to the required driving force is corrected so as to suppress the pitching vibration which is one of the on-spring body vibrations.

Therefore, the pitching vibration is timely suppressed so as to reduce the effects of ever-changing various disturbances caused by driver's operation and road condition, etc., so that each state quantity of the vehicle can be stabilized, as well as travelling.

Figure 3:
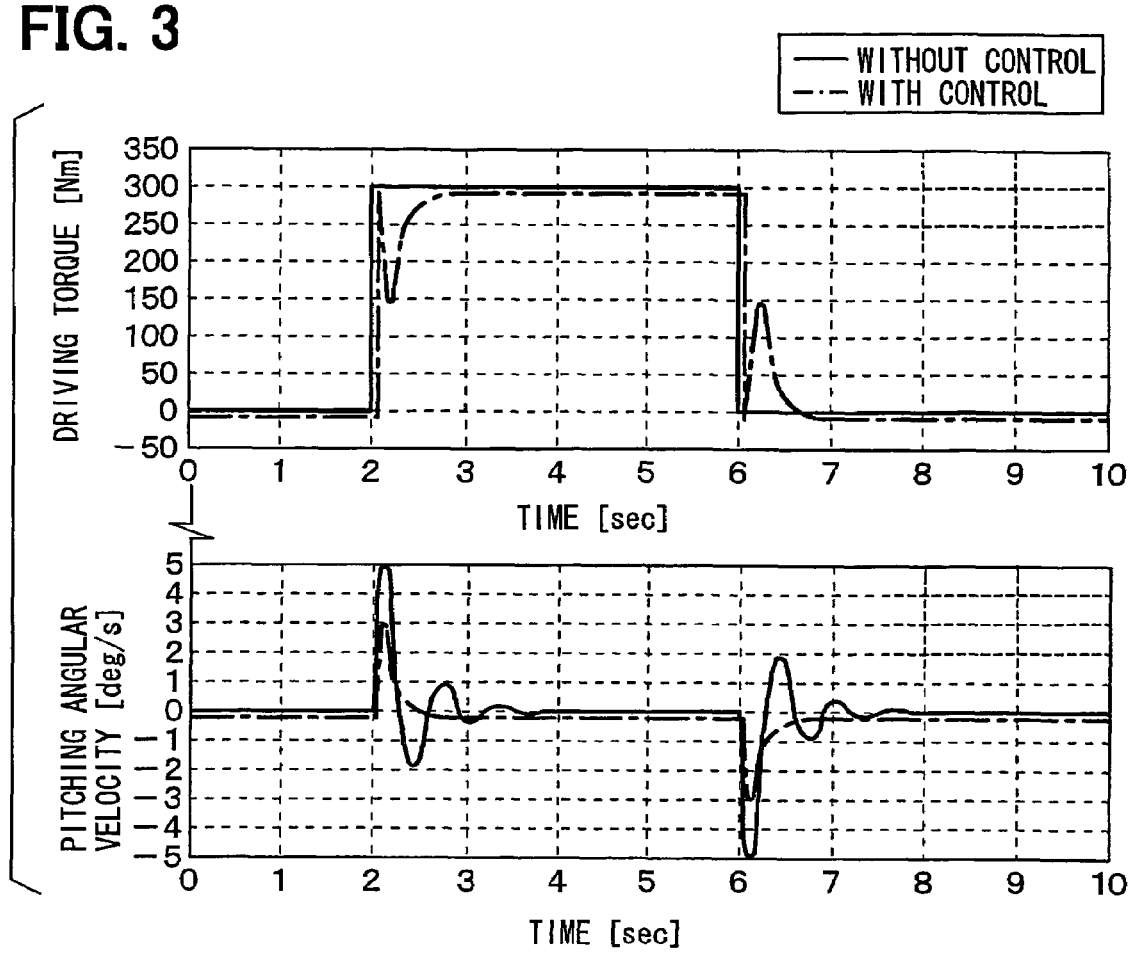
FIG. 3 is a pair of graphs illustrating the results of a simulation involving a varying pitching angular velocity and a varying driving torque.

As a reference, a simulation result on the variation of the pitching angular velocity with respect to the variation of the driving torque is shown in FIG. 3. It should be appreciated from this FIG. 3 that the pitching angular velocity under control by the system of the present embodiment has a small amplitude and is quickly stabilized in comparison to that without the control.

Accordingly, the present embodiment of the present invention can stabilize the vehicle body in response to variations in the driver's operational disturbance and road disturbances, etc., thereby maintaining the body posture and improving vehicle performance and ride quality and traveling stability.

Second Embodiment

A second embodiment of the invention will now be described. In the above first embodiment described above, to suppress the pitching vibration, a correction is obtained by which the variation of the pitching vibration is quickly reduced to zero. In contrast, in the second embodiment, to suppress the fluctuation of the front wheel contact load, the derivative term $\Delta Wfd$ of the variation of the front wheel contact load is quickly reduced to zero. Since the structure of the vehicle stability control system of the present embodiment is the same as that of the first embodiment shown in FIGS. 1 and 2, only different points from the first embodiment will be described here.

In the vehicle stability control system of the second embodiment, only the process in the required engine torque correction unit 2e is performed differently from the first embodiment. That is, in the vehicle stability control system according to the present embodiment, first the required engine torque correction unit 2e obtains a current driving torque by the same method as the first embodiment. Then, using the current driving torque as an input, a correction necessary for suppressing the fluctuation of the front wheel contact load is obtained from the equation of state in the on-spring vehicle body vibration model, and the base required engine torque calculated by the base required engine torque calculation unit 2b is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present embodiment, by substituting each estimated state quantity into the output equation of the derivative term $\Delta Wfd$ of the variation of the front wheel contact load, given by equation 25, the derivative term $\Delta Wfd$ is obtained and then a correction to be able to suppress this variation is obtained.

The correction is obtained in the same way as in the first embodiment. This correction is multiplied by the speed reducing ratio of the final reduction gear 12 and then is divided by the gear ratio in the transmission 11. The resulting value is subtracted from the base required torque calculated by the base required torque calculation unit 2a.

The correction of the engine torque is thereby obtained as an absolute value with respect to the base required engine torque, and the absolute value is used as a corrected required engine torque.

As described above, according to the vehicle stability control system of the second embodiment, various on-spring vehicle body vibrations are estimated using the vehicle body vibration model, and the required engine torque corresponding to the required driving force is corrected so as to suppress the variation of the front wheel contact load.

Therefore, the effects of ever-changing various disturbances caused by a driver's operation and road conditions, etc., are reduced to timely suppress the fluctuation of the front wheel contact load, so that each state quantity of a vehicle can be stabilized. Traveling of the vehicle can also be thereby stabilized.

Figure 4:
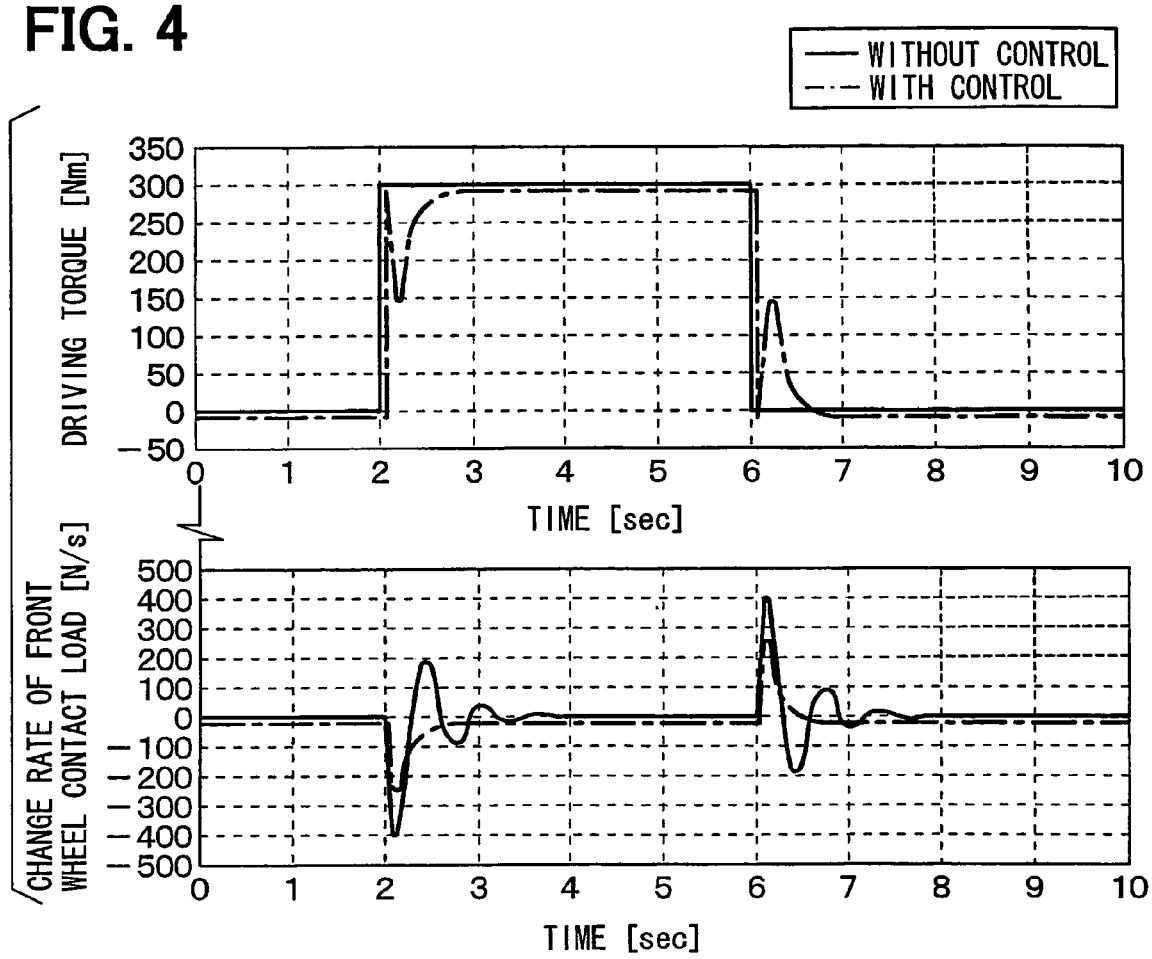
FIG. 4 is a pair of graphs illustrating the results of a simulation involving a change rate of a front wheel contact load and a varying driving torque.

As a reference, a simulation result on the variation of the change rate of the front wheel contact load with respect to the variation of the driving torque is shown in FIG. 4. It should be appreciated from this drawing that the change rate of the front wheel contact load under control by the system of the second embodiment has a small amplitude and is quickly stabilized in comparison with that without the control.

Accordingly, the second embodiment of the present invention can prevent the fluctuation of the body stability caused by driver's operation disturbance and road disturbance etc. from damaging the body posture and vehicle performance to improve the ride quality and traveling stability of a vehicle.

Third Embodiment

A third embodiment of the present invention will now be described. In the second embodiment, the fluctuation of the front wheel contact load is suppressed whereas, in the third embodiment, the derivative term ΔWrd of the variation of the rear wheel contact load is quickly reduced to zero to suppress the fluctuation of the rear wheel contact load. Since the structure of the vehicle stability control system of the present embodiment is also the same as that of the first embodiment shown in FIGS. 1 and 2, only different points from the first embodiment will be described here.

In the vehicle stability control system of the present embodiment, only the process in the required engine torque correction unit 2e is performed differently from the first embodiment. That is, in the vehicle stability control system according to the present embodiment, first the required engine torque correction unit 2e obtains a current driving torque by the same method as the first embodiment. Then, using the current driving torque as an input, a correction necessary for suppressing the fluctuation of the rear wheel contact load is obtained from the equation of state in the on-spring vehicle body vibration model, and the base required engine torque calculated by the base required engine torque calculation unit 2b is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present embodiment, by substituting each estimated state quantity into the output equation of the derivative term ΔWrd of the variation of the rear wheel contact load, given by equation 26, the derivative term ΔWrd is obtained and then a correction to be able to suppress this variation is obtained.

The correction is obtained in the same way as in the first embodiment. This correction is multiplied by the speed reducing ratio of the final reduction gear 12 and then is divided by the gear ratio in the transmission 11. The resulting value is subtracted from the base required torque calculated by the base required torque calculation unit 2a.

The correction of the engine torque is thereby obtained as an absolute value with respect to the base required engine torque, and the absolute value is used a corrected required engine torque.

As described above, according to the vehicle stability control system of the embodiment, various on-spring vehicle body vibrations are estimated using the vehicle body vibration model, and the required engine torque corresponding to the required driving force is corrected so as to suppress the variation of the rear wheel contact load.

Therefore, the effects of ever-changing various disturbances caused by driver's operation and road condition etc. are reduced to timely suppress the fluctuation of the rear wheel contact load, so that each state quantity of a vehicle can be stabilized. Traveling of the vehicle can thereby be stabilized.

Figure 5:
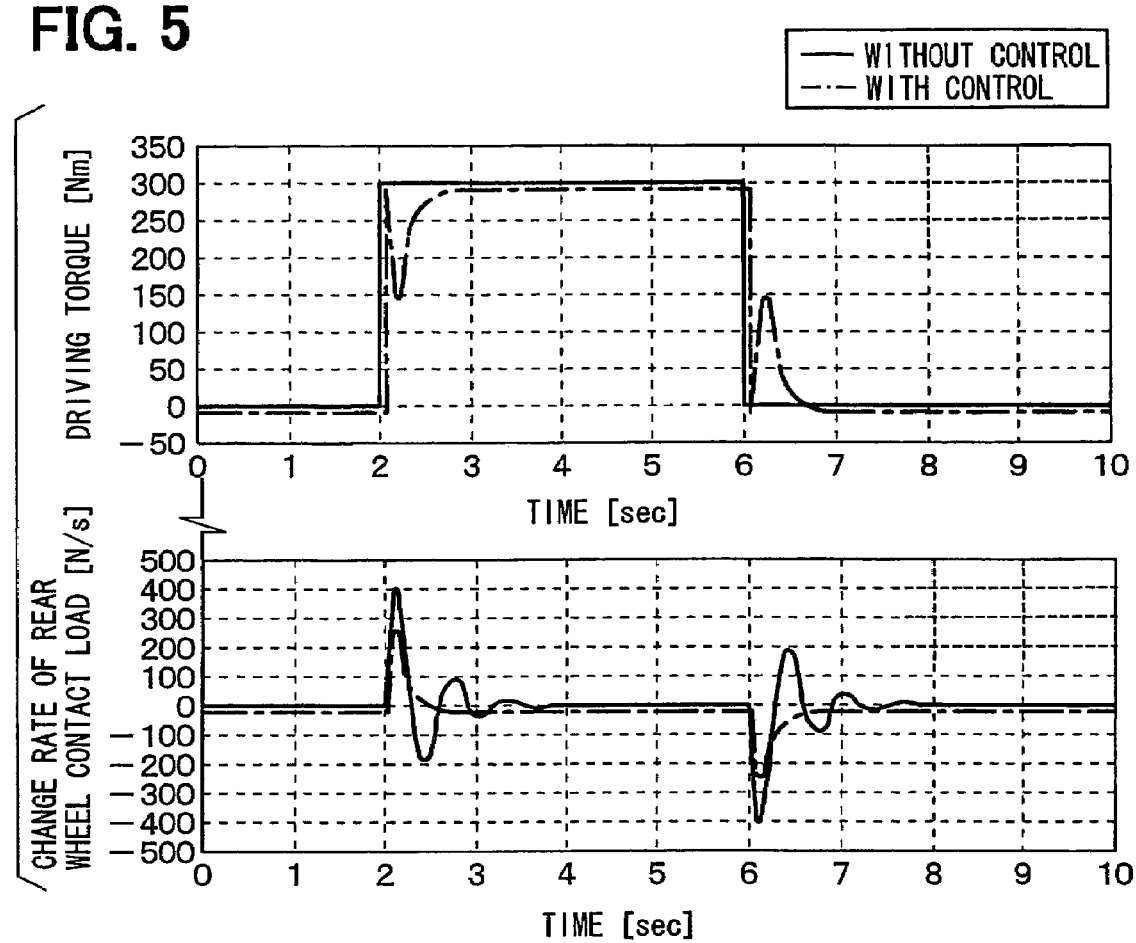
FIG. 5 is a pair of graphs illustrating the results of a simulation involving a change rate of the rear wheel contact load and a varying driving torque.

As a reference, a simulation result on the variation of the change rate of the rear wheel contact load with respect to the variation of the driving torque is shown in FIG. 5. It should be appreciated from this drawing that the change rate of the rear wheel contact load with control by the embodiment has a small amplitude and is quickly stabilized in comparison with that without the control.

Accordingly, the present embodiment can prevent the fluctuation of the body stability caused by driver's operation disturbance and road disturbance etc. from damaging the body posture and vehicle performance to improve the ride quality and traveling stability of a vehicle.

Fourth Embodiment

A fourth embodiment of the present invention will now be described. In the present embodiment, to suppress the vertical motion of the vehicle body, its variation is quickly reduced to zero. Since the structure of the vehicle stability control system of the present embodiment is also the same as that of the first embodiment shown in FIGS. 1 and 2, only different points from the first embodiment will be described here.

In the vehicle stability control system of the present embodiment, only the process in the required engine torque correction unit 2e is performed differently from the first embodiment. That is, in the vehicle stability control system according to the present embodiment, first the required engine torque correction unit 2e obtains a current driving torque by the same method as the first embodiment. Then, using the current driving torque as an input, a correction necessary for suppressing the fluctuation of the vertical motion of the vehicle body is obtained from the equation of state in the on-spring vehicle body vibration model, and the base required engine torque calculated by the base required engine torque calculation unit 2b is corrected on the basis of the correction.

Specifically, if the current driving torque is estimated, each state quantity of various on-spring vehicle body vibrations having an excitation source created by the driving torque reaction to the current driving torque can be estimated on the basis of the equations of state given by equations 18 and 19. In the present embodiment, by substituting each estimated state quantity into the output equation of the variation x' (=x2) of the vertical motion of the vehicle body, given by equation 27, the variation of the vertical motion of the vehicle body is obtained and then a correction to be able to suppress this variation is obtained.

The correction is obtained in the same way as in the first embodiment. This correction is multiplied by the speed reducing ratio of the final reduction gear 12 and then is divided by the gear ratio in the transmission 11. The resulting value is subtracted from the base required torque calculated by the base required torque calculation unit 2a.

The correction of the engine torque is thereby obtained as an absolute value with respect to the base required engine torque, and the absolute value is used as a corrected required engine torque.

As described above, according to the vehicle stability control system of the embodiment, various on-spring vehicle body vibrations are estimated using the vehicle body vibration model, and the required engine torque corresponding to the required driving force is corrected so as to suppress the fluctuation of the vertical motion of the vehicle body.

Therefore, the effects of ever-changing various disturbances caused by driver's operation and road condition etc. are reduced to timely suppress the fluctuation of the vertical motion of the vehicle body. Each state quantity of a vehicle can thereby be stabilized as if the vehicle were pressed from above, so that traveling of the vehicle can be stabilized.

Figure 6:
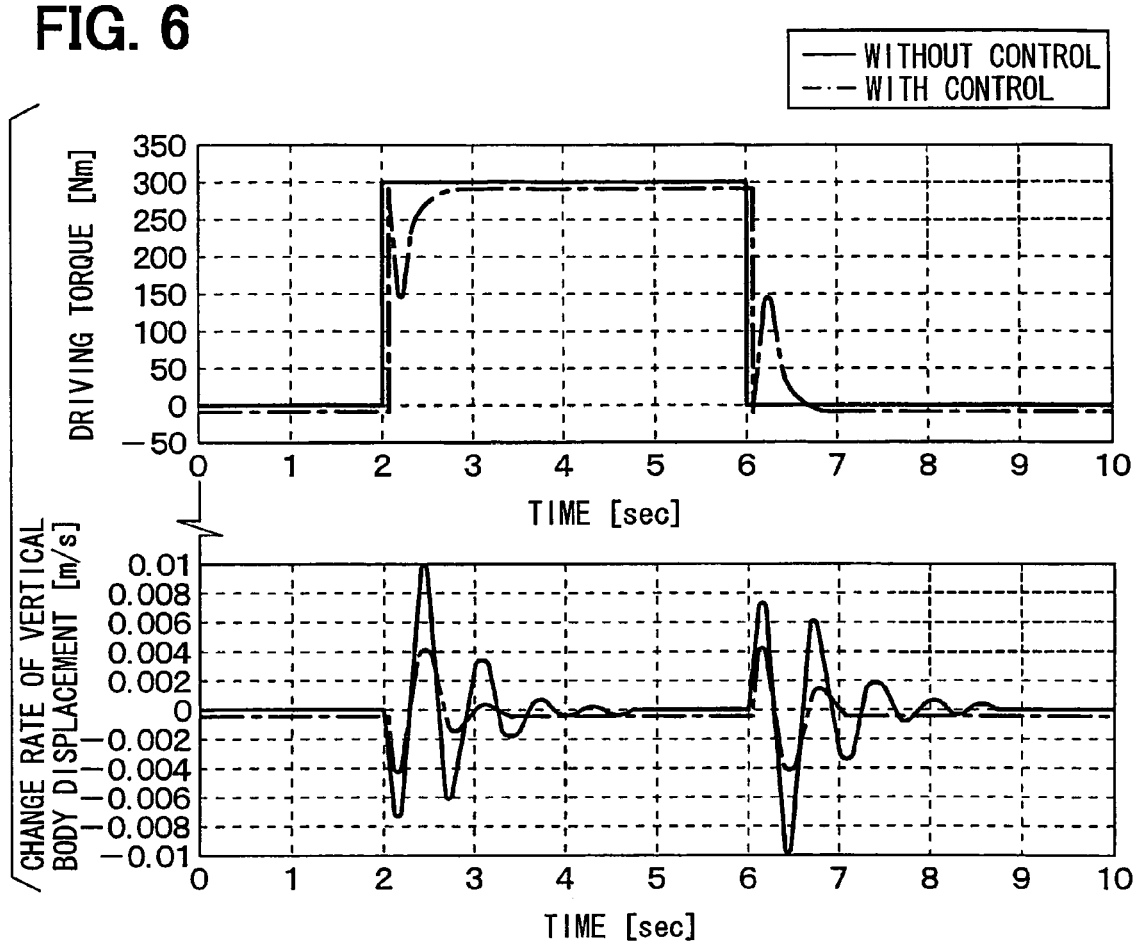
FIG. 6 is a pair of graphs illustrating the results of a simulation involving a vertical displacement change rate of a vehicle body and a varying driving torque.

As a reference, a simulation result on the variation of the change rate of the vertical displacement of the vehicle body with respect to the variation of the driving torque is shown in FIG. 6. It should be appreciated from this drawing that the change rate of the vertical displacement of the vehicle body with control by the embodiment has a small amplitude and is quickly stabilized in comparison with that without the control.

Accordingly, the embodiment can prevent the fluctuation of the body stability caused by driver's operation disturbance and road disturbance, etc., from damaging the body posture and vehicle performance to improve the ride quality and traveling stability of a vehicle.

OTHER EMBODIMENTS (1) The above embodiments have been described as having an engine torque based control mode, but this is shown as only one of a plurality of exemplary parameters that determine the driving force. Thus, the present invention is not limited to this engine torque based control mode.

Figure 7:
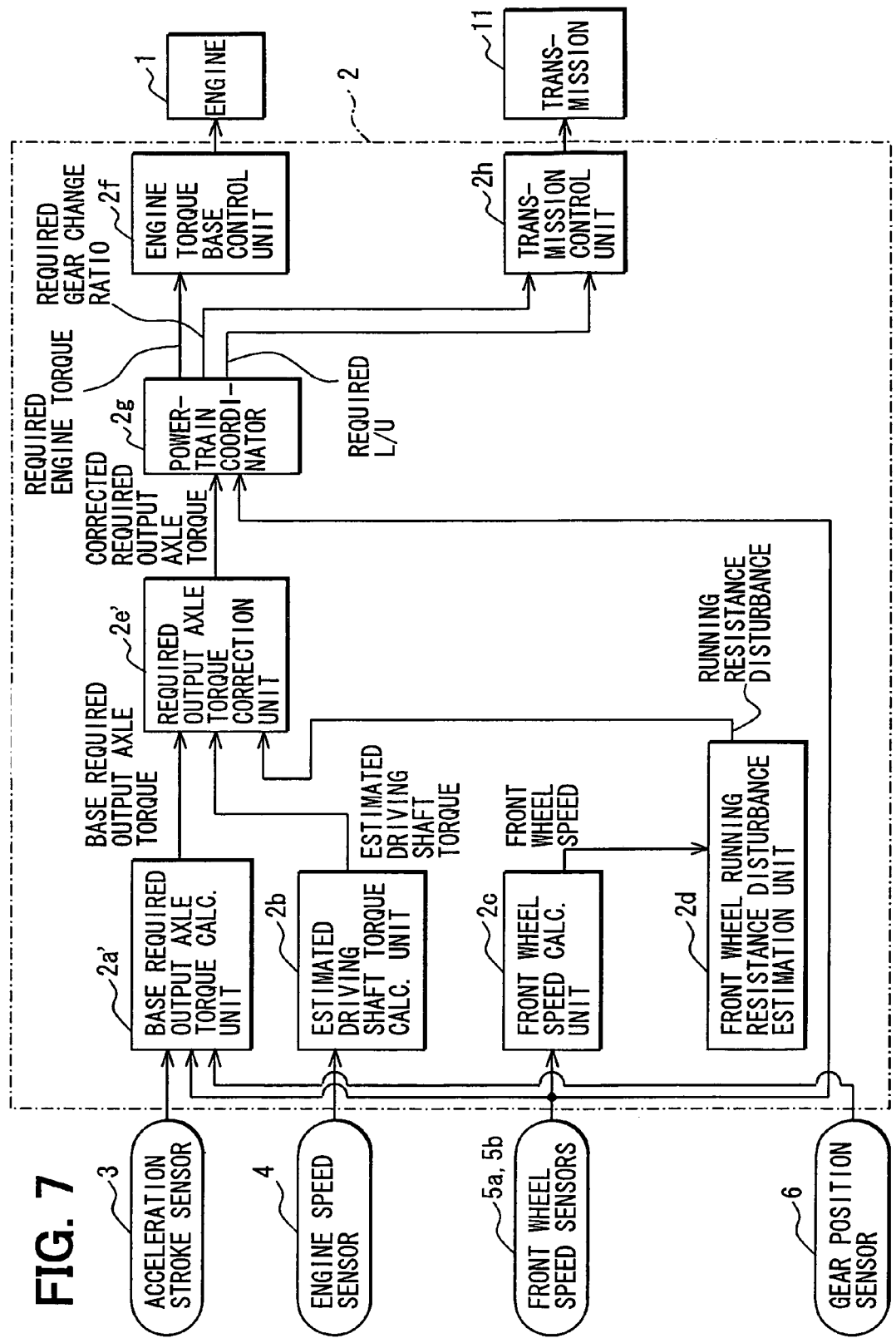
FIG. 7 is a block diagram of an engine electronic control unit in an axle torque based control mode according to the present invention.
Figure 8:
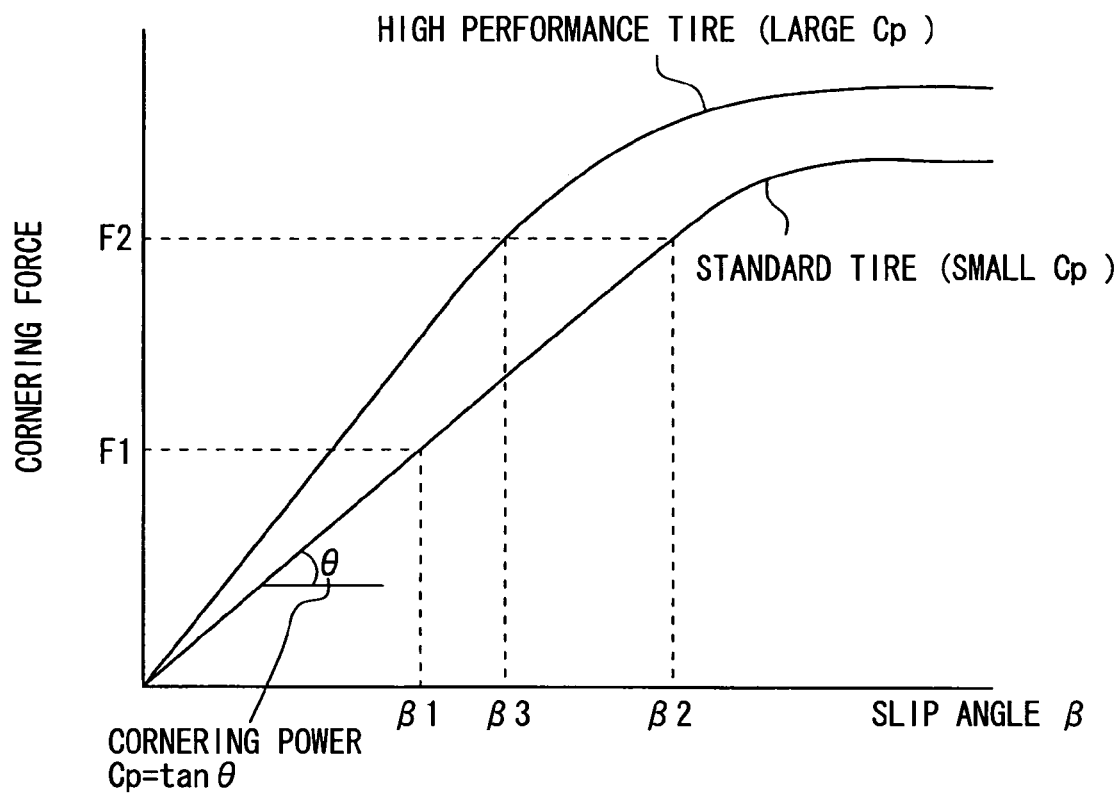
FIG. 8 is a graph illustrating a relationship between slip angles and cornering forces for each of a standard and a high performance tire.
Figure 9A:
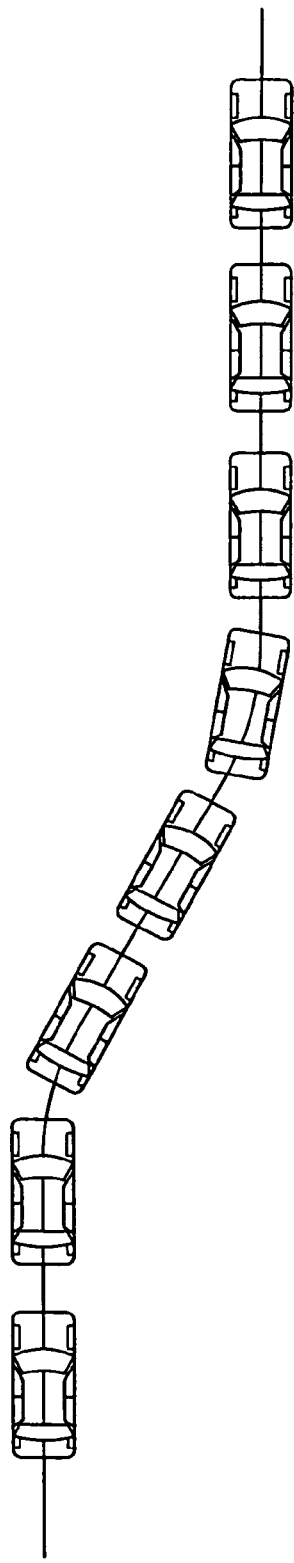
FIG. 9A is a graphical depiction of a vehicle trajectory obtained when a sufficient cornering force can be produced with a small slip angle.
Figure 9B:
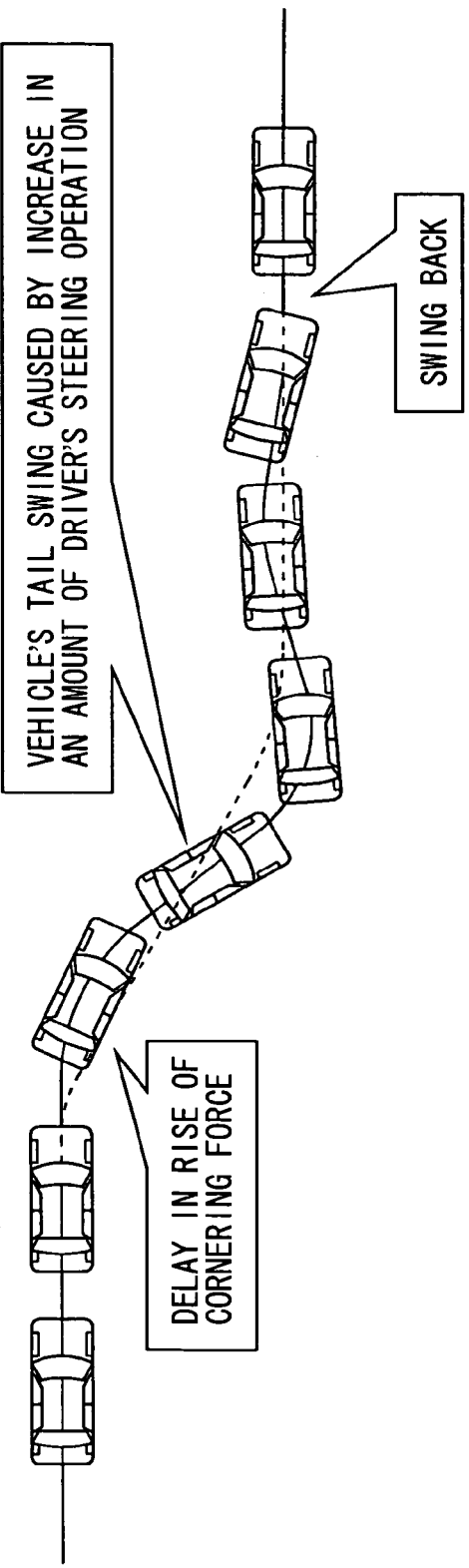
FIG. 9B is a graphical depiction of a vehicle trajectory obtained when a sufficient cornering force cannot be produced without a large slip angle.
Figure 10A:
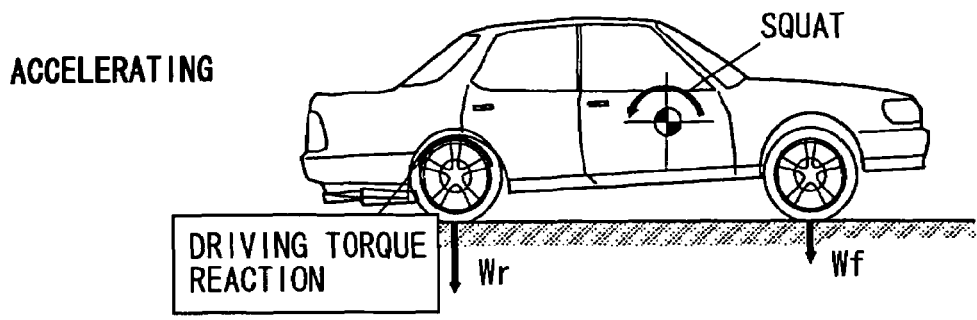
FIGS. 10A-10C are side views of a vehicle accelerating, decelerating, and turning, respectively.
Figure 10B:
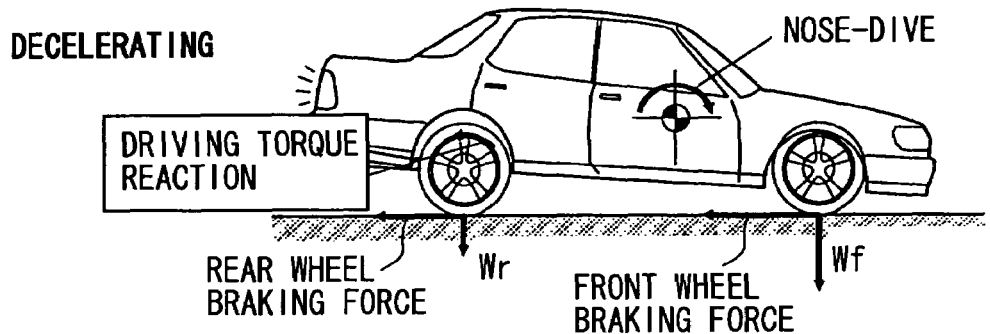
Figure 10C:
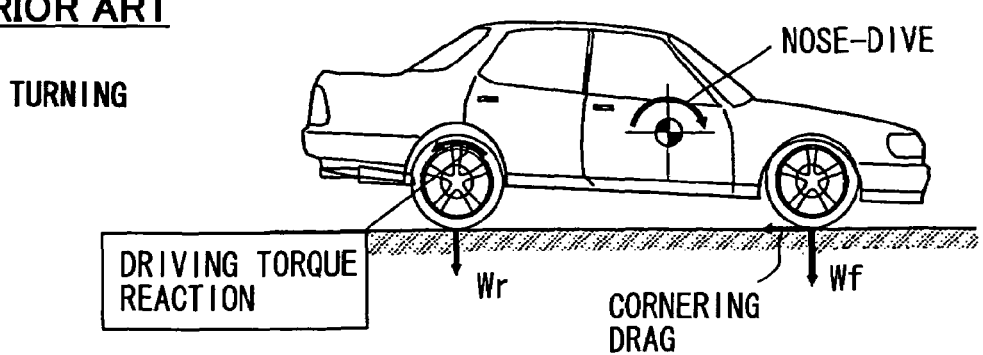
Figure 11A:
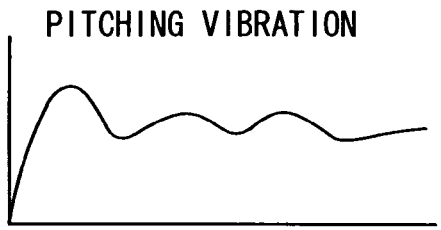
FIGS. 11A-11C are timing charts of a pitching vibration, front and rear wheel contact loads, and front and rear wheel cornering powers, respectively.
Figure 11B:
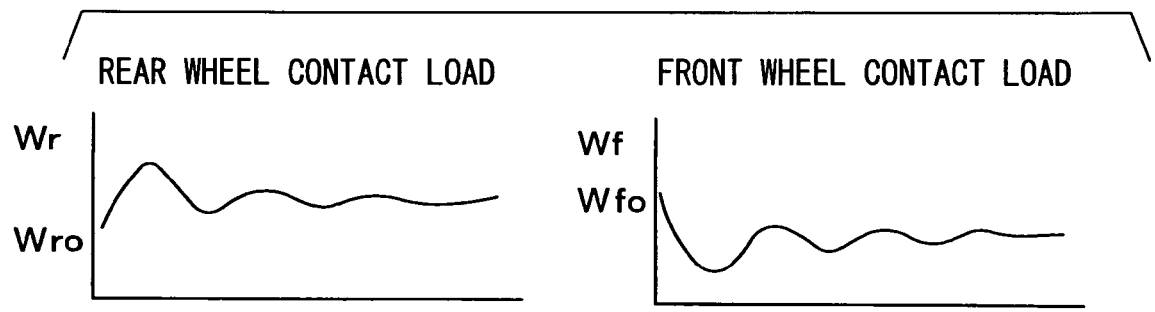
Figure 11C:
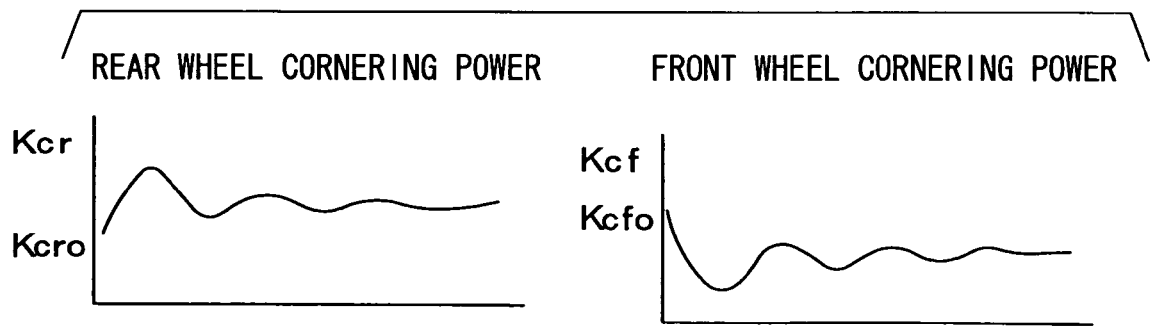
Figure 12:
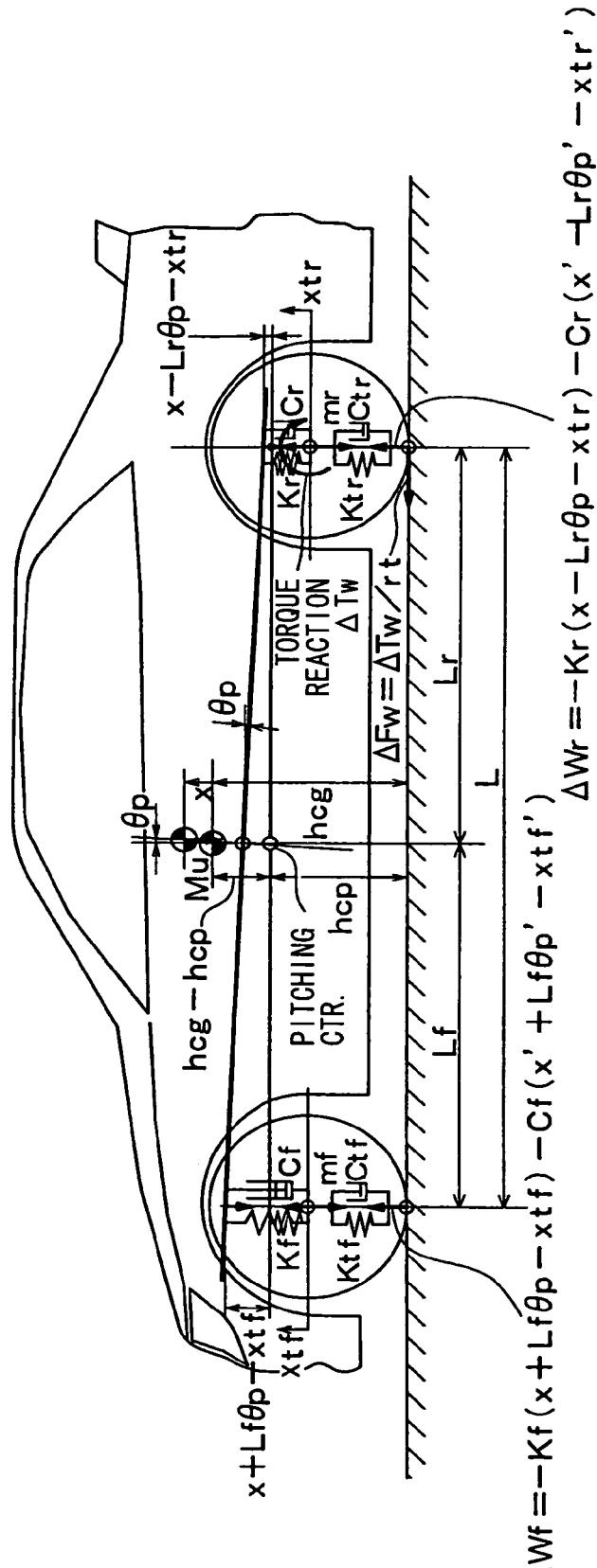
FIG. 12 is a side view of an on-spring vehicle body vibration model according to the principles of the present invention.

An axle torque based control mode, for example, can be employed. In this case, as shown in FIG. 7, the base required engine torque calculation unit 2a in the engine ECU 2 is replaced with a base required output axle torque calculation unit 2a' and also the required engine torque correction unit 2e with a required output axle torque correction unit 2e'. A correction, which is necessary to correct the base required output axle torque obtained by the base required output axle torque calculation unit 2a', is obtained by the required output axle torque correction unit 2e'. The correction is multiplied by the speed reducing ratio of the final reduction gear 12 and then is subtracted from the required output axle torque to obtain a corrected required output axle torque. Another parameter determining a driving force can thus be used.

In this case, however, a power-train coordinator 2g is disposed before an engine torque base control unit 2f as used in each of the above embodiments (see FIG. 2), and a transmission control unit 2h is provided in parallel with the engine torque base control unit 2f. In this structure, the power-train coordinator 2g obtains the required engine torque on the basis of the corrected required output axle torque, and also obtains the required gear change ratio and required L/U on the basis of the corrected required output axle torque and vehicle speed. Then, the engine torque base control unit 2f sets a throttle position, an amount of fuel injection, and ignition timing so as to obtain the required engine torque, and the transmission control unit 2h sets the duty factor for the solenoid in the transmission 11 so as to obtain the required gear change ratio and required L/U.

(2) In the above embodiments, when other factors necessary for correcting the required driving force occur, for example, when a traction controller and a sideslip prevention controller request to correct the required driving torque, it is possible to take this into consideration and correct the required driving force. In this case, the base required engine torque obtained as a required driving force is corrected according to the requests from the traction controller and sideslip prevention controller, and the resulting value may be regarded as a base required engine torque that has not yet been corrected in consideration of the on-spring vehicle body vibration.

(3) In the above embodiments, an example has been described in which the state feedback gain Ks is obtained by an optimal regulator design method, but other various methods used in control systems such as, for example, a pole assignment method may be applied to the design of the system.

What is claimed is:

1. A vehicle stability control system comprising:
a base required driving force calculation unit that calculates a physical quantity corresponding to a base required driving force desired by a driver to generate the base required driving force at a driving wheel of a vehicle;
an estimated driving force estimation unit that obtains a physical quantity corresponding to an estimated driving force that is estimated as being generated in the vehicle; and
a required driving force correction unit that obtains a corrected required driving force in such a way that a fluctuation of a front or rear wheel contact load occurring in the vehicle when the estimated driving force is generated is obtained on the basis of the physical quantity corresponding to the estimated driving force, a correction to reduce a derivative term of the fluctuation of the front or rear wheel contact load is obtained, and the physical quantity corresponding to the base required driving force calculated by the base required driving force calculation unit is corrected on the basis of the correction,
wherein the corrected required driving force obtained by the required driving force correction unit is generated at the driving wheel.

2. The vehicle stability control system according to claim 1, wherein the required driving force correction unit has an equation of state describing state quantities of the vehicle on the basis of an on-spring body model of the vehicle and an output equation describing the derivative term of the fluctuation of the front or rear wheel contact load with the state quantities on the basis of the equation of state, and the physical quantity corresponding to the base required driving force is corrected so as to reduce the derivative term of the fluctuation of the front or rear wheel contact load obtained from the output equation and the state quantities.

* * * * *

UNITED STATES PATENT AND TRADEMARK OFFICE
CERTIFICATE OF CORRECTION

| | | |
|---|---|---|
| PATENT NO. | : 7,599,763 B2 | Page 1 of 1 |
| APPLICATION NO. | : 11/214643 | |
| DATED | : October 6, 2009 | |
| INVENTOR(S) | : Matsumoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 916 days.

Signed and Sealed this

Twenty-eighth Day of September, 2010

David J. Kappos
*Director of the United States Patent and Trademark Office*